United States Patent [19]

Harvey

[11] 4,179,838

[45] Dec. 25, 1979

[54] TRIGGER FOR TRAP

[75] Inventor: Joseph C. Harvey, West Yarmouth, Mass.

[73] Assignee: Woodstream Corporation, Lititz, Pa.

[21] Appl. No.: 883,800

[22] Filed: Mar. 6, 1978

[51] Int. Cl.² .......................................... A01M 23/24
[52] U.S. Cl. ............................................ 43/92; 43/96
[58] Field of Search ................... 43/88, 90, 92, 93, 94, 43/95, 96

[56] References Cited

U.S. PATENT DOCUMENTS

| 2,947,107 | 8/1960 | Lehn | 43/92 |
| 3,010,245 | 11/1961 | Conibear | 43/92 X |
| 3,426,471 | 2/1969 | Lehn | 43/92 |
| 3,816,955 | 6/1974 | Conibear | 43/90 |
| 3,991,509 | 11/1976 | Frost | 43/93 |
| 4,071,972 | 2/1978 | Conibear | 43/92 |

*Primary Examiner*—Nicholas P. Godici
*Attorney, Agent, or Firm*—Holman & Stern

[57] ABSTRACT

Trigger formed from a single piece of wire to provide two legs and a head in the bight, the head being formed to clip around a jaw of a trap to provide a frame around the dog.

4 Claims, 7 Drawing Figures

TRIGGER FOR TRAP

BACKGROUND OF THE INVENTION

One of the problems that is encountered in trapping is that the trigger which releases the "body-hold" or "choke" trap is somewhat delicate and is not only subject of deterioration (due to the fact that it is used in water having varying degrees of electrolytic action), but is also subjected to rough handling by the trapper as he stores it and carries it to the locations where it is to be used. Many trappers, therefore, find themselves in the position where they have a perfectly good trap, except for the fact that the original trigger is broken or afterwise rendered useless. Although it is possible to replace the old trigger, this usually must be done in a workshop, since such an operation is undesirable to perform in inclement weather and without adequate tools. These and other difficulties experienced with the prior art devices have been obviated in a novel manner by the present invention.

It is, therefore, an outstanding object of the invention to provide a trigger which may be applied to a trap in the field without the use of tools.

Another object of this invention is the provision of a trigger for a trap, which trigger will release the dog when moved either perpendicular or parallel to the plane of the trap.

A further object of the present invention is the provision of a trigger for a trap, which trigger is relatively free of corrosion and breakage.

It is another object of the instant invention to provide a replacement trigger for a trap, wherein the old, useless trigger need not be removed before the replacement trigger is applied to the trap.

A still further object of the invention is the provision of a trigger of such a nature that a moderate supply may be carried by the trapper and applied directly to traps in the field without taking the traps back to a workshop.

It is a further object of the invention to provide a trigger for a trap, which trigger is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a trigger for use with a trap having a jaw in the form of a bar or bail bent to form a substantial angle, the trigger including a head adapted resiliently to embrace the bar and including a pair of thin actuating legs extending from the head toward the interior in the general plane of the jaw.

More specifically, the legs and head are integrally formed of a single length of wire, the legs constituting the ends, while the head is formed in the bight. The head embraces the bar so as to expose an area of the bar for contact with the notched dog of the trap. The head provides a frame outlining the said area, so that movement of the trigger (in either direction of rotation about the axis of the bar or in either direction axially of the bar) causes a portion of the frame to contact the dog and release it from the bar to actuate the trap.

BRIEF DESCRIPTION OF THE DRAWINGS

The character of the invention, however, may be best understood by reference to one of its structural forms, as illustrated by the accompanying drawings in which.

DESCRIPTION OF THE PREFERRED EMBODIMENT

Figure 1:
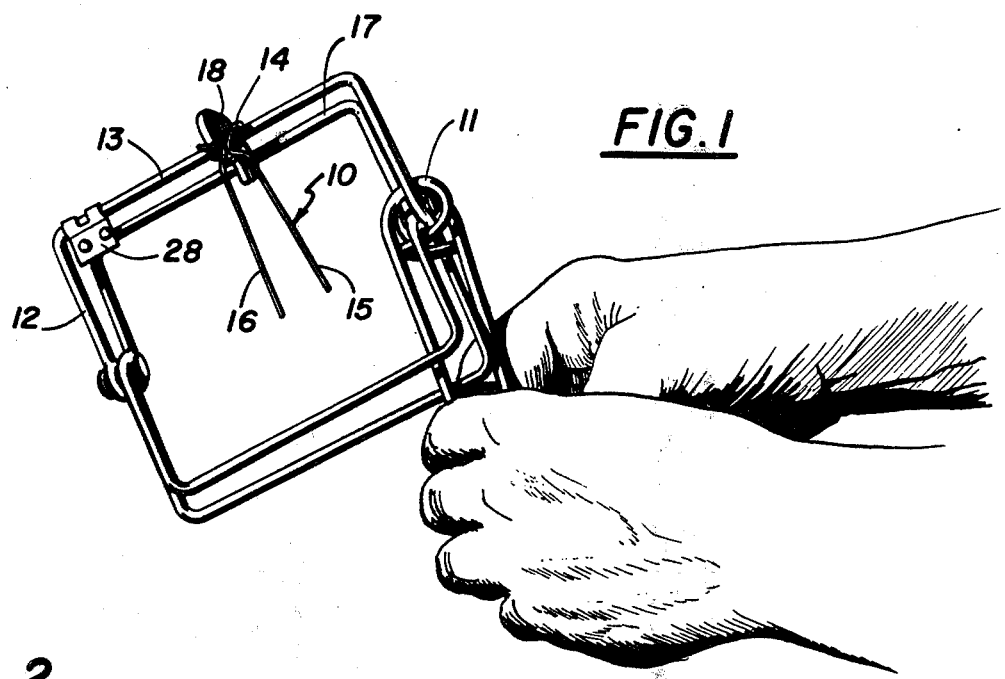
FIG. 1 is a perspective view of a trigger embodying the principles of the present invention shown in use on a trap.

Referring first to FIG. 1, wherein are best shown the general features of the invention, the trigger, indicated generally by the reference numeral 10, is shown in use with a trap 11. The trap has a jaw 12 in the form of a bail or bar bent to form a right angle at each end. This trap is of the general type shown and described in the U.S. Pat. of Lehn No. 2,947,107 of Aug. 2, 1960.

The trap is shown as having, in addition to the jaw 12 and its bar 13, a second jaw 17 and an old trigger 28. A notched dog 18 is hinged on one end to the jaw 17.

Figure 2:
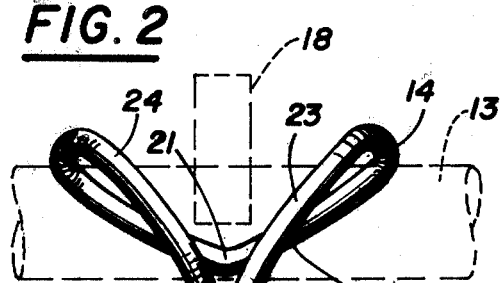
FIGS. 2, 3, and 4 are front elevational, side elevational, and plane views, respectively, of the trigger.
Figure 3:
Figure 3:
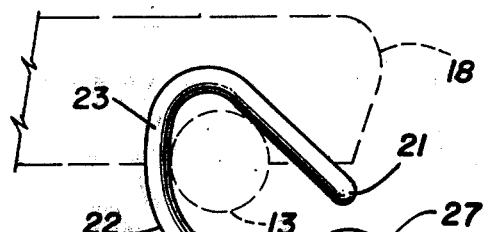
Figure 4:
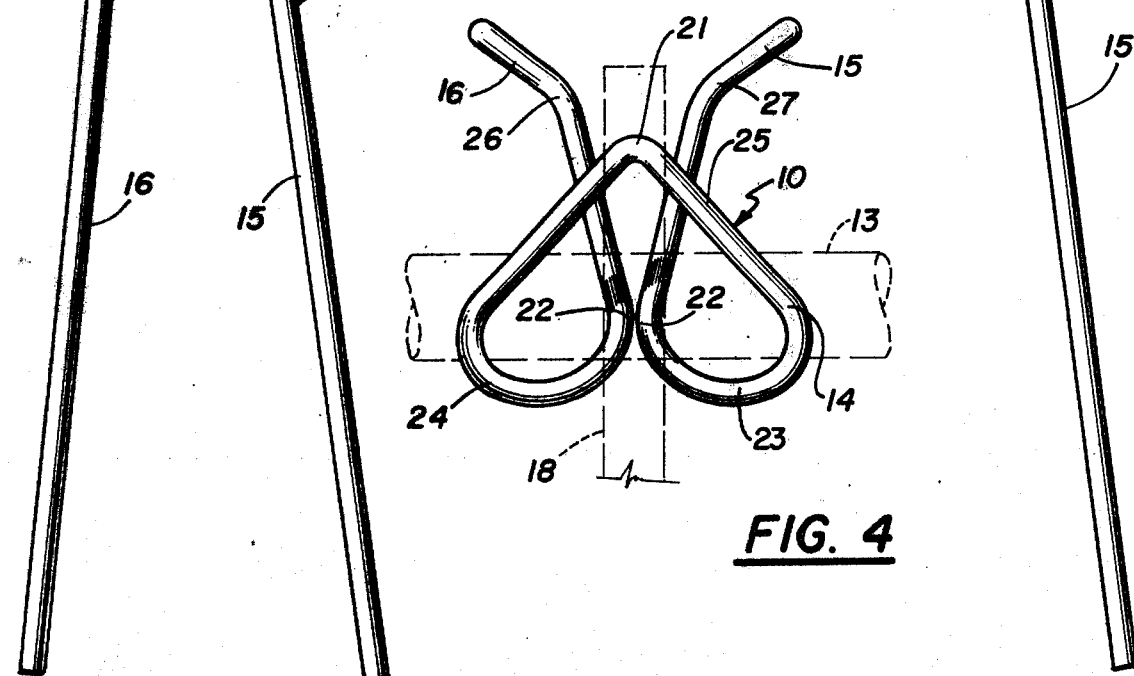

Referring now to FIGS. 2, 3, and 4, it can be seen that the trigger 10 is provided with a head 14 adapted to resiliently embrace the bar 13 of the trap and a pair of thin actuating legs 15 and 16 extending from the bar toward the interior of the trap and in the general plane of the jaw 12.

Figure 7:
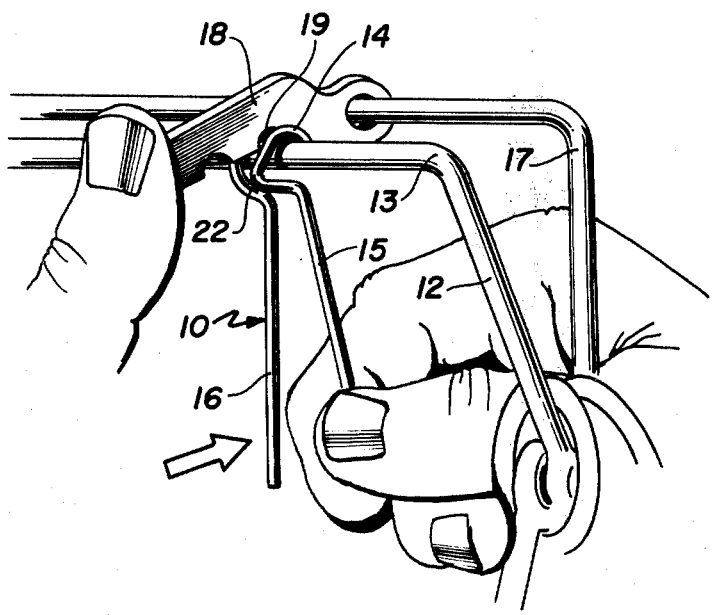

The head 14 of the trigger has contact points 21 and 22 which lie on opposite sides of the bar 13 under the notch 19 in the dog 18 (See FIG. 7). One of the contact points engages the dog and releases it from the bar when the actuating legs are pushed out of the plane of the jaw. The dog 18 for setting the trap extends from the second jaw to the first mentioned jaw 12 and the notch 19 extends around a portion of the bar.

The legs 15 and 16 and the head 14 are integrally formed of a single length of stainless steel wire, the legs constituting the ends of the wire, while the head is formed in the bight. The head 14 consists of two arcuate portions 23 and 24 joined at their ends to the legs 15 and 16, respectively. These arcuate portions lie in planes which are generally transverse to the bar 13. The trigger is provided with a third arched portion 25 which joins the other ends of the two above-mentioned arcuate portions, the third portion extending around the bar. Each leg 15 and 16 is joined to its arcuate portion 23 and 24 by a small knee 26 and 27, respectively, whose center of curvature is in the opposite direction from that of the first mentioned arcuate portions. The arcuate portions 23 and 24 serve as the first contact point 22 where they approach one another, while the center of the third arcuate portion 25 acts as the second contact point 21. The head 14 embraces the bar 13 in such a manner that it exposes an area of the bar for contact with the dog 18, the head providing a frame which outlines the said area. A movement of the trigger in either direction of rotation (either about the axis of the bar or in either direction axially of the bar) causes a portion of the frame to contact the dog and release it from the bar to actuate the trap.

Figure 5:
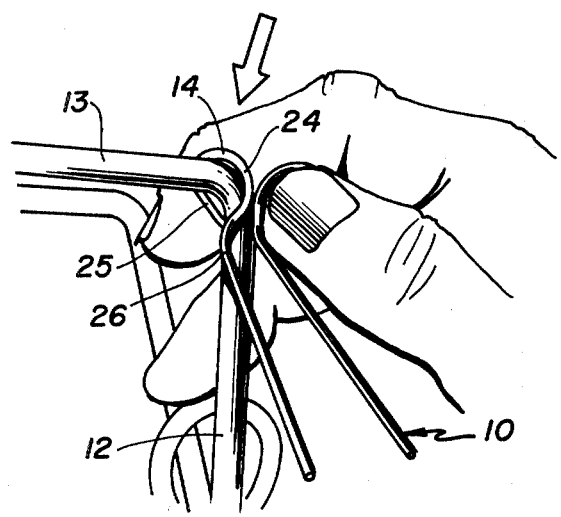
FIGS. 5, 6, and 7 show three separate steps in the operation of inserting the trigger on a trap.
Figure 6:
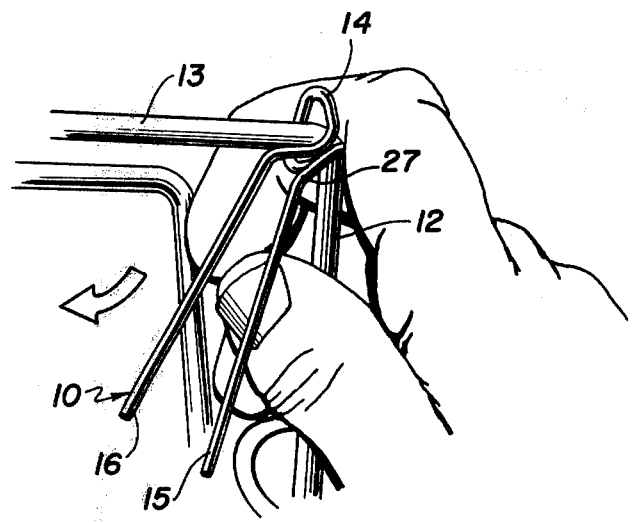

The operation and advantages of the present invention will now be readily understood in view of the above description. Let us assume that the trap 11 is in the condition shown in FIG. 1, in which the old trigger 28 has become rusted and the wire-like fingers have broken off. In the past, the only course of action was to take the trap back to the workshop and use tools to remove the old trigger. With the present invention, it is only necessary to slide the old trigger off to one side, as shown in the drawing, and to apply the new trigger of the present invention. Referring to FIG. 5, the trigger 10 is applied to the corner of the jaw 12 and one half of the trigger is snapped in place, this being the portion between the knee 26 and the arcuate portion 25. The resilience in the wire-like member permits this half of the trigger to be snapped over the corner until the corner arrives in contact with the arcuate portion 24. Then, as shown in FIG. 6, the entire trigger is rotated, thus snapping over the corner the portion defined by the knee 27 and the arched portion 25, so that the arcuate portion 23 now comes in contact with the bar. At that time the trigger is now in fully inserted condition on the jaw and may be slid to a central portion for operative use with the dog 18. The trigger is applied, of course, to the same jaw 12 as the old trigger 28.

The trigger is slid to the center of the jaw and the dog is rotated into contact with the bar 13; a portion of the bar is exposed between the arcuate portions 23 and 24 of the trigger. Actually, the trigger provides for exposure in a frame of a portion of the bar 13, the frame being defined by the arcuate portions 23, 24, and arched portion 25, the frame being somewhat lozenge-shaped. The dog is held firmly down on the bar with one hand, while with his other hand the user bends the fingers 15 and 16 until they are fully located in the plane of the jaw. The trap is now set. Any movement of the trigger (by an animal) will release the dog and, therefore, release the trap. This is true whether the movement be perpendicular to the plane of the jaw or in the plane of the jaw. In other words, any movement in a range of 360° will cause release of the dog and actuation of the trap.

Because the trigger is formed of a single piece of stainless steel, the possibility of it becoming inoperative due to corrosion is practically non-existent. It is possible for the trapper to carry a handful of these replacement triggers in his pocket or pack for application in the field. It is, therefore, not necessary for him to carry the trap back to the workshop to refurbish it. In addition, the trigger is sometimes an improvement over the trigger that was originally furnished with the trap, due to the fact that it can be actuated in all directions and is, therefore, more sensitive to animal movement.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Trigger for use with an animal trap having first and second jaws and a dog for setting the trap, said dog being pivotally mounted on one of said jaws and being engagable with the other of said jaws to hold the trap in set condition, said trigger fitting onto said other of said jaws for releasing the dog when the trigger is moved by an animal, said trigger comprising a single piece of rod material shaped to define a pair of elongated legs and a head connecting said legs, said head including first and second arcuate portions ajoining the respective legs and a third portion connecting said first and second arcuate portions, said head fitting over said other of said trap jaws with said first and second arcuate portions on one side of the jaw, with said third portion on the opposite side of the jaw and with said dog when engaged with the jaw being located between said first and second arcuate portions, said head including contact points on said opposite sides of the jaw for engaging the dog when the trigger is moved to release the dog and spring the trap.

2. Trigger as recited in claim 1 wherein said first and second arcuate portions flair outwardly from the respective legs towards said third portion.

3. Trigger as recited in claim 1, wherein the head embraces the bar so as to expose an area of the bar for contact with the dog, the head providing a frame outlining the said area, and wherein movement of the trigger in either direction of rotation about the axis of the bar or in either direction axially of the bar causes a portion of the frame to contact the dog and release it from the bar.

4. Trigger as recited in claim 2, wherein each leg is joined to its respective arcuate portion by a small knee whose center of curvature is in the opposite direction from that of the respective arcuate portion, the first and second arcuate portions having adjacent sections acting as a first contact point, while the center of the third portion acts as a second contact point.

* * * * *